Patented Nov. 28, 1950

2,531,973

UNITED STATES PATENT OFFICE 2,531,973

DYESTUFFS CONTAINING TWO HETEROCYCLIC NITROGEN NUCLEI AND AN ALKYL MERCAPTO METHINYL LINKING RADICAL AND THEIR PREPARATION

Harry Derek Edwards and John David Kendall, Ilford, England, assignors to Ilford Limited, Ilford, England, a British company No Drawing. Application January 2, 1948, Serial No. 380. In Great Britain January 9, 1947

7 Claims. (Cl. 260—240.4)

This invention relates to dyestuffs and particularly to dyestuffs which serve as optical sensitisers for photographic silver halide emulsions.

According to this invention dyestuffs are obtained by condensing a compound of the general Formula I:

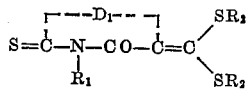

where $D_1$ is an oxygen atom or a sulphur atom, $R_1$ is a hydrocarbon group and $R_2$ is an alkyl or aralkyl group, with a compound containing a reactive methylene group, in the presence of a basic condensing agent.

The production of compounds of general Formula I is described in U. S. application Serial No. 379 corresponding to British Patent application No. 772/47 filed on even date herewith.

More particularly, according to this invention, the reaction is effected with one of the following classes of compound which contain reactive methylene groups:

(a) A five-membered ring compound containing the system:

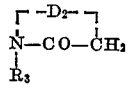

where $R_3$ is a hydrogen atom or a hydrocarbon group and $D_2$ is the residue of a heterocyclic nitrogen keto-methylene nucleus.

(b) A quaternary salt of a heterocyclic nitrogen compound (as hereinafter defined) having a reactive methylene group (this term including a reactive methyl group or mono-substituted methyl group) substituted in the α or γ position to a heterocyclic nitrogen atom, e. g. a compound of the general formula:

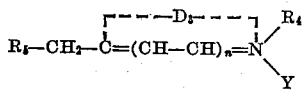

where $D_3$ is the residue of a heterocyclic nitrogen compound (as hereinafter defined), $n$ is nought or 1, Y is an acid radical, $R_4$ is an alkyl or aralkyl group and $R_5$ is a hydrogen atom or hydrocarbon group.

The foregoing compounds (a) and (b) are characterised by the fact that they contain a reactive $CH_2$ group (a reactive methyl group, which may be written as $—CH_2—H$, includes a reactive methylene group).

Where in the foregoing formulae reference is made to the fact that a group may be a hydrocarbon group, it is intended to imply that the group in question may be an alkyl, aryl, or aralkyl group or an unsaturated hydrocarbon group; examples are lower alkyl groups, i. e. methyl, ethyl, propyl and butyl groups and high fatty alkyl groups, benzyl and naphthyl-methyl groups, phenyl and naphthyl groups, allyl and cinnamyl and like groups. Where the hydrocarbon group contains an aryl residue, such residue may itself be substituted, e. g. with alkyl or aralkyl groups, oxyalkyl groups, alkyloxy groups, amino groups, hydroxy groups and halogen atoms.

The expression "heterocyclic nitrogen compound" is used in this specification and in the claims to mean any of the following: thiazoles, oxazoles, selenazoles and their polycyclic homologues such as those of the benzene, naphthalene, acenaphthene and anthracene series; pyridine and its polycyclic homologues such as quinoline and naphthaquinolines; lepidines; indolenines; diazines, such as pyrimidines and quinazolines; diazoles (e. g. thio-ββ'-diazole); oxazolines, thiazolines and selenazolines. The expression also includes polycyclic compounds of these series which are substituted in the carbocyclic rings with one or more groups such as alkyl, aryl, amino, hydroxy, alkoxy and methylene-dioxy groups, or by halogen atoms.

Examples of the compounds of type (a) which may be employed according to the invention are rhodanic acid, oxarhodanic acid (which is 2-thio-4-keto tetrahydro-oxazole) and N-hydrocarbon substituted derivatives of either of these compounds, oxindoles, pyrazole-5-ones, hydantoin, thio-hydantoin, ψ-hydantoin and ψ-thio-hydantoin.

Compounds of the type (b) which may be employed may be derived from any of the heterocyclic nuclei listed in the foregoing definition of the expression "heterocyclic nitrogen compound."

The formation of the dyestuffs is readily effected by heating the reagents together in the presence of a base, e. g. pyridine, piperidine, diethylamine, triethylamine and triethanolamine, or an inorganic base such as a solution of sodium or sodium acetate in ethyl alcohol and preferably in the presence of a solvent.

Where a reagent of type (b) is employed, the quarternary salt (i. e. the radicle Y) may be a sulphate, p-toluene sulphonate, chloride, bromide or iodide.

The products of the processes of this invention contain a thione grouping. These products may be reacted with alkyl or aralkyl salts and the resulting products then reacted with a further compound of type (a) or (b) to add a further ring system to the product. If this second condensation is also with a compound of type (a) which is a rhodanic or oxarhodanic acid, the process may be repeated. This general type of process involving the successive addition of rhodanic or oxarhodanic acid groups is described in United States Patent No. 2,388,963 to which reference may be made for operative details.

The following examples will serve to illustrate this invention but are not to be regarded as limiting it in any way:

Example 1

One molecular equivalent of 2-thio-3-methyl-4-keto-5-di(methylthio)-methylene tetrahydrothiazole and one molecular equivalent of 1-methyl benzthiazole ethiodide were boiled gently in ethyl alcohol containing one molecular equivalent of triethylamine. The required dye crystallised on cooling as green crystals with a bronze reflex. After washing with water and ethyl alcohol these crystals had a melting point of 152° C. The dye gave a magenta solution in benzene an a bluish-magenta solution in ethyl alcohol and is believed to have the formula:

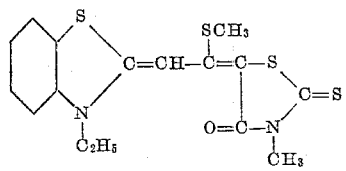

When incorporated in a gelatin silver iodobromide emulsion it imparted a band of sensitivity extending to 6600 Å. with a maximum at 6100 Å.

Example 2

The procedure of Example 1 was followed using one molecular equivalent of quinaldine ethiodide instead of the 1-methyl benzthiazole ethiodide. The dye obtained, which was believed to have the formula:

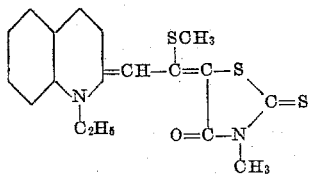

had a melting point of 214° C. and consisted of green crystals with a bronze reflex.

Example 3

One molecular equivalent of 2-thio-3-methyl-4-keto-5-di(methylthio) methylene tetrahydrothiazole was boiled gently under reflux for 10 minutes in ethyl alcohol with one molecular equivalent of lepidine methiodide and one molecular equivalent of triethylamine. A brilliant blue colour rapidly developed. The reaction mixture was diluted with water and the precipitated dye separated by filtration. It was recrystallised from a mixture of benzene and light petroleum and had melting point 207° C. The dye gave a blue solution in alcohol and a mauve solution in ether. It is believed to have the formula:

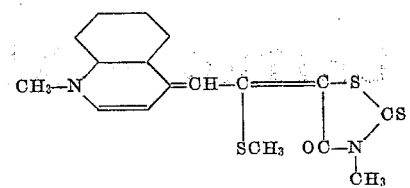

Example 4

One molecular equivalent of 2-thio-3-methyl-4-keto-5-di(methylthio) methylene tetrahydrothiazole was boiled gently under reflux for ten minutes with one molecular equivalent of 1-phenyl-3-methyl pyrazole-5-one and one molecular equivalent of triethylamine in ethyl alcohol. On acidification with acetic acid, followed by dilution with water, the dye was obtained. It was very insoluble in both alcohol and benzene and was purified by boiling with benzene and filtering hot from the more soluble impurities. The residue, melting point 285° C., could be dissolved in alcohol as the ammonium salt and also gave a silver salt which was pink and insoluble. The dye is believed to have the formula:

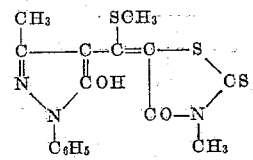

Example 5

One molecular equivalent of 2-thio-3-ethyl-4-keto-5-di(methylthio) methylene tetrahydroxazole was boiled gently under reflux for 20 minutes with one molecular equivalent of 2-methyl benzthiazole ethiodide and one molecular equivalent of triethylamine in ethyl alcohol. The mixture was acidified with acetic acid and diluted with water to precipitate the dye. Recrystallisation from ethyl alcohol gave the dye in blue needles, melting point 174° C., which dissolved in ether to give an orange solution and in alcohol to give a red solution. The dye is believed to have the formula:

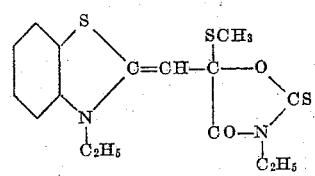

This dye, when incorporated in a gelatino silver iodobromide photographic emulsion, imparted a band of sensitivity extending to about 6200 Å. with a maximum at about 5800 Å.

Example 6

One molecular equivalent of 2-thio-3-ethyl-4-keto-5-di(methylthio) methylene tetrahydro oxazole was boiled gently under reflux with one molecular equivalent of β-benz lepidine ethiodide and one molecular equivalent of triethylamine in ethyl alcohol for 20 minutes. Dilution with water precipitated the dye, melting point 180° C. Recrystallisation from methyl alcohol, in which the dye was sparingly soluble, gave the product melting point 195° C. The dye was very soluble in benzene giving a red solution from which the material was recovered with melting point unchanged by precipitation with light petroleum. The dye is believed to have the formula:

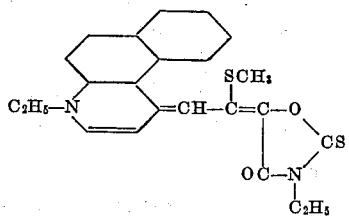

*Example 7*

One molecular equivalent of 2-methyl-β-naphthathiazole was fused at 100° for 15 hours with one molecular equivalent of methyl p-toluene sulphonate. One molecular equivalent of 2-thio-3 - ethyl - 4 - keto - 5 - di(methylthio) methylene tetrahydro oxazole was added and the mixture boiled gently under reflux for 20 minutes with ethyl alcohol and one moleclular equivalent of triethylamine. On dilution an oil precipitated which was separated by decantation and hardened by addition of ethyl alcohol to give the dye. Recrystallisation from a mixture of benzene and light petroleum gave the product as green crystals with a gold reflex, melting point 230° C., which gave magenta colour in alcoholic solution. The dye is believed to have the formula:

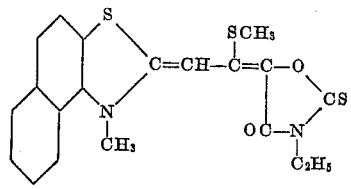

This dye, when incorporated in a gelatino silver iodobromide emulsion, imparted a band of sensitivity extending to about 6500 Å. with a maximum at about 6100 Å.

What we claim is:

1. Process for the production of dyestuffs which comprises condensing a compound of the general formula:

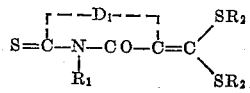

where $D_1$ is selected from the class consisting of the oxygen atom and the sulphur atom, $R_1$ is a hydrocarbon group and $R_2$ is an alkyl group, with a heterocyclic nitrogen compound containing a reactive methylene group, in the presence of a basic condensing agent.

2. Process for the production of dyestuffs which comprises condensing a compound of the general formula:

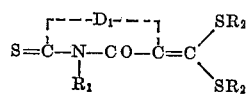

where $D_1$ is selected from the class consisting of the oxygen atom and the sulphur atom, $R_1$ is a hydrocarbon group and $R_2$ is an alkyl group, with a five-membered ring compound containing the system:

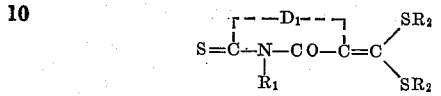

where $R_3$ is selected from the class consisting of the hydrogen atom and hydrocarbon groups and $D_2$ is the residue of a heterocyclic nitrogen keto-methylene nucleus, and effecting said condensating in the presence of a basic condensing agent.

3. Process for the production of dyestuffs which comprises condensing a compound of the general formula:

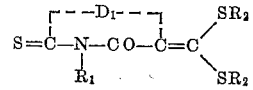

where $D_1$ is selected from the class consisting of the oxygen atom and the sulphur atom, $R_1$ is a hydrocarbon group and $R_2$ is an alkyl group, with a quaternary salt of a heterocyclic nitrogen compound having a reactive methylene group in one of the α and γ positions to the heterocyclic nitrogen atom, and effecting said condensation in the presence of a basic condensing agent.

4. Process for the production of dyestuffs which comprises condensing a compound of the general formula:

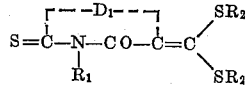

where $D_1$ is selected from the class consisting of the oxygen atom and the sulphur atom, $R_1$ is a hydrocarbon group and $R_2$ is an alkyl group, with a pyrazole-5-one containing an unsubstituted methylene group in the 4-position, and effecting said condensation in the presence of a basic condensing agent.

5. Process for the production of dyestuffs which comprises condensing a compound of the general formula:

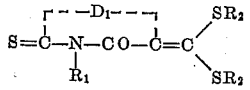

where $D_1$ is selected from the class consisting of the oxygen atom and the sulphur atom, $R_1$ is a hydrocarbon group and $R_2$ is an alkyl group, with a quaternary salt of a compound containing a thiazole nucleus and having a reactive methyl group in the α position to the nitrogen atom of that nucleus, and effecting said condensation in the presence of a basic condensing agent.

6. Process for the production of dyestuffs which comprises condensing a compound of the general formula:

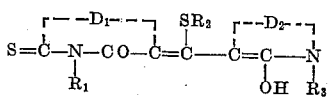

where $D_1$ is selected from the class consisting of the oxygen atom and the sulphur atom, $R_1$ is a hydrocarbon group and $R_2$ is an alkyl group, with a quaternary salt of a compound containing a pyridine nucleus and having a reactive methyl group in one of the α and γ positions to the nitrogen atom of that nucleus, and effecting said condensation in the presence of a basic condensing agent.

7. Dyestuffs of the general formula:

$$S=\overset{|}{\underset{R_1}{C}}-N-CO-\overset{SR_2}{\underset{}{C}}=\overset{}{\underset{}{C}}-\overset{}{\underset{OH}{C}}=\overset{}{\underset{R_3}{C}}-N$$
(with $D_1$ bracket over left side and $D_2$ bracket over right side)

where $D_1$ is selected from the class consisting of the oxygen atom and the sulphur atom, $R_1$ is a hydrocarbon group and $R_2$ is an alkyl group, $R_3$ is a hydrocarbon group and $D_2$ is the residue of a heterocyclic nitrogen keto-methylene nucleus.

HARRY DEREK EDWARDS.
JOHN DAVID KENDALL.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,322,015 | Hamer et al. | June 15, 1943 |
| 2,334,711 | Kendall | Nov. 23, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,397,013 | Kendall | Mar. 19, 1946 |
| 2,397,014 | Kendall | Mar. 19, 1946 |

FOREIGN PATENTS

| Number | Country | Date |
|---|---|---|
| 549,201 | Great Britain | Nov. 11, 1942 |

OTHER REFERENCES

Chemical Abstracts, 16:3101 (abstract of Brit. Med. Journal, 1922, I, 514–515).

Chemical Abstracts, 19:530, (abstract of Proc. Roy. Soc., London, 96B 317–333, 1924).